US012662576B2

(12) United States Patent
Li et al.

(10) Patent No.: US 12,662,576 B2
(45) Date of Patent: Jun. 23, 2026

(54) METHOD FOR PRODUCING ORGANOPOLYSILOXANE

(71) Applicant: DOW SILICONES CORPORATION, Midland, MI (US)

(72) Inventors: Peng Li, Shanghai (CN); Xiaocong Xu, Shanghai (CN); Hongjun Ma, Shanghai (CN); Yan Zheng, Shanghai (CN); Shuhua Zhang, Shanghai (CN); Yejun Wu, Shanghai (CN); Hui Zhu, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 1079 days.

(21) Appl. No.: 17/639,458

(22) PCT Filed: Sep. 3, 2019

(86) PCT No.: PCT/CN2019/104158
§ 371 (c)(1),
(2) Date: Mar. 1, 2022

(87) PCT Pub. No.: WO2021/042262
PCT Pub. Date: Mar. 11, 2021

(65) Prior Publication Data
US 2022/0340713 A1      Oct. 27, 2022

(51) Int. Cl.
*C08G 77/08*      (2006.01)
*C08G 77/18*      (2006.01)

(52) U.S. Cl.
CPC ............. *C08G 77/08* (2013.01); *C08G 77/18* (2013.01)

(58) Field of Classification Search
None
See application file for complete search history.

(56) References Cited

U.S. PATENT DOCUMENTS

| | | | |
|---|---|---|---|
| 2,851,473 A | 9/1958 | Wagner et al. | |
| 4,196,139 A | 4/1980 | Seiler et al. | |
| 6,319,982 B1 | 11/2001 | Huang et al. | |
| 6,660,281 B1 | 12/2003 | Nakanishi et al. | |
| 8,119,758 B2 | 2/2012 | Sakurai et al. | |
| 2006/0116525 A1 | 6/2006 | Geisberger et al. | |
| 2007/0290202 A1 | 12/2007 | Matsumoto et al. | |
| 2007/0293624 A1 | 12/2007 | Matsumoto et al. | |
| 2008/0057325 A1 | 3/2008 | Sakurai et al. | |
| 2008/0312366 A1 | 12/2008 | Maton et al. | |
| 2009/0018301 A1 | 1/2009 | Thomas et al. | |
| 2009/0111963 A1 | 4/2009 | Lafore et al. | |
| 2010/0113730 A1 | 5/2010 | Morita | |
| 2010/0140538 A1 | 6/2010 | Sekiba | |
| 2010/0234518 A1 | 9/2010 | Ferritto et al. | |
| 2014/0018485 A1 | 1/2014 | Cook et al. | |
| 2014/0163135 A1 | 6/2014 | Guyer et al. | |
| 2015/0059102 A1* | 3/2015 | Souda .................... | C02F 1/547 |
| | | | 210/732 |

FOREIGN PATENT DOCUMENTS

| | | |
|---|---|---|
| BE | 875581 A | 7/1979 |
| CN | 101935455 A | 1/2011 |
| CN | 103896977 A | 7/2014 |
| CN | 104892939 A | 9/2015 |
| DE | 1182435 B | 11/1964 |
| EP | 0641799 A2 | 3/1995 |
| EP | 2933284 B1 | 8/2017 |
| IN | 105669968 A | 3/2019 |
| JP | H0912709 A | 1/1997 |
| JP | H0920866 A | 1/1997 |
| JP | 2001072891 A | 3/2001 |
| JP | 2001151889 A | 6/2001 |
| JP | 2006124713 A | 5/2006 |
| JP | 2009504876 A | 2/2009 |
| JP | 2014509682 A | 4/2014 |
| KR | 100715465 B1 | 5/2007 |
| WO | 2006125628 A1 | 11/2006 |
| WO | 2013066983 A1 | 5/2013 |

OTHER PUBLICATIONS

International Search Report for PCT/CN2019/104158 dated May 27, 2020, 2 pages.
Machine assisted English translation of CN101935455A obtained from https://patents.google.com/patent on Apr. 25, 2022, 13 pages.
Machine assisted English translation of CN104892939 obtained from https://patents.google.com/patent on Apr. 25, 2022, 11 pages.
Machine assisted English translation of CN103896977 obtained from https://patents.google.com/patent on Apr. 25, 2022, 7 pages.
Machine assisted English translation of DE1182435 obtained from https://patents.google.com/patent on Apr. 25, 2022, 4 pages.
Machine assisted English translation of CN105669968 obtained from https://patents.google.com/patent on Apr. 25, 2022, 7 pages.
Machine assisted English translation of JPH0920866A obtained from https://worldwide.espacenet.com/patent on Sep. 19, 2023, 11 pages.
Machine assisted English translation of JPH0912709A obtained from https://worldwide.espacenet.com/patent on Sep. 19, 2023, 11 pages.
Machine assisted English translation of JP2001151889A obtained from https://worldwide.espacenet.com/patent on Sep. 19, 2023, 6 pages.

* cited by examiner

*Primary Examiner* — Megan McCulley
(74) *Attorney, Agent, or Firm* — Warner Norcross + Judd LLP

(57) ABSTRACT

A method for producing an organopolysiloxane having at least one silicon atom-bonded alkoxysilylalkyl group per molecule is provided. The method comprises the following steps: (i) treating an organopolysiloxane having at least one silicon atom-bonded hydrogen atom per molecule with an alkali salt of carboxylic acid; (ii) removing the alkali salt from the organopolysiloxane; and (iii) reacting the organopolysiloxane with an alkenyl group-containing alkoxysilane in the presence of a platinum-based catalyst. The organopolysiloxane is generally obtained by the method without hydrolyzing any alkoxysilylalkyl groups, and is useful as a surface modifier for various types of fillers.

13 Claims, No Drawings

METHOD FOR PRODUCING ORGANOPOLYSILOXANE

CROSS-REFERENCE TO RELATED APPLICATIONS

This application is the U.S. National Stage of and claims priority to International Application No. PCT/CN2019/104158 filed on 3 Sep. 2019, the content of which is incorporated herein by reference.

TECHNICAL FIELD

The present invention relates to a method for producing an organopolysiloxane which has at least one silicon atom-bonded alkoxysilylalkyl group per molecule.

BACKGROUND ART

Alkoxysilylalkyl groups are introduced onto organopolysiloxanes for various purposes, including improvement of reactivity to inorganic fillers, and improvement of compatibility between other organopolysiloxane and the inorganic fillers. Alkoxysilylalkyl group-containing organopolysiloxane are generally known (see Patent Documents 1-3). Such organopolysiloxane are obtained by a hydrosilylation reaction of an organopolysiloxane having silicon atom-bonded hydrogen atoms per molecule with an alkenyl group-containing alkoxysilane in the presence of a platinum base catalyst. Generally, the organopolysiloxane having silicon atom-bonded hydrogen atoms contains minute amount of acid catalyst residues which is used as a polymerization catalyst, and the acidic catalyst residues enhance a hydrolysis of silicon atom-bonded alkoxy groups. In the production process, it is difficult to obtain the alkoxysilylalkyl group-containing organopolysiloxane without hydrolyzing any alkoxysilylalkyl groups under harsh reaction conditions, e.g., conditions of a high process temperature of 100-150° C., and conditions in which water can't be totally removed.

PRIOR ART DOCUMENTS

Patent Documents

Patent Document 1: U.S. Patent Application Publication No. 2007/0290202 A1
Patent Document 2: U.S. Patent Application Publication No. 2007/0293624 A1
Patent Document 3: U.S. Pat. No. 8,119,758 B2

BRIEF SUMMARY OF INVENTION

Technical Problem

The object of the present invention is to provide the producing method of the organopolysiloxane having a silicon atom-bonded alkoxysilylalkyl group per molecule without hydrolyzing any alkoxysilylalkyl groups.

Solution to Problem

The present invention is a method for producing an organopolysiloxane having at least one silicon atom-bonded alkoxysilylalkyl group per molecule, comprising the following steps:

(i) treating an organopolysiloxane having at least one silicon atom-bonded hydrogen atom per molecule with an alkali salt of carboxylic acid;
(ii) removing the alkali salt from the organopolysiloxane; and
(iii) reacting the organopolysiloxane obtained by the step (ii) with an alkenyl group-containing alkoxysilane in the presence of a platinum base catalyst.

In various embodiments, the organopolysiloxane in the step (i) is represented by the following general formula:

$$R^1_2HSiO(R^1_2SiO)_nSiR^1_2H$$

wherein each $R^1$ is the same or different hydrocarbon group with 1 to 12 carbon atoms and is free of an aliphatic unsaturated bond, and "n" is an integer of from 0 to 100.

In various embodiments, the alkali salt in the step (i) is selected from sodium salt of acetic acid, or sodium salt of propionic acid.

In various embodiments, the alkoxysilane in the step (iii) is represented by the following general formula:

$$R^2SiR^3_a(OR^4)_{(3-a)}$$

wherein $R^2$ is an alkenyl group with 2 to 12 carbon atoms, $R^3$ is a hydrocarbon group with 1 to 12 carbon atoms and is free of an aliphatic unsaturated bond, $R^4$ is an alkyl group with 1 to 3 carbon atoms, and "a" is 0, 1 or 2.

In various embodiments, the platinum base catalyst in the step (iii) is selected from platinum fine powder, platinum black, platinum supporting silica fine powder, platinum supporting activated carbon, chloroplatinic acid, alcohol-modified chloroplatinic acid, or complexes of chloroplatinic acid with olefins, aldehydes, vinylsiloxanes or acetylene alcohols.

In various embodiments, the platinum base catalyst in the step (iii) is added in an amount that platinum metal in the catalyst is in a range of from about 1 to about 1,000 ppm in mass unit relative to the total mass of the organopolysiloxane and the alkoxysilane.

In various embodiments, the organopolysiloxane in the step (iii) is reacted with the alkenyl group-containing alkoxysilane and an olefin with 4 to 20 carbon atoms simultaneously.

In various embodiments, the olefin is selected from 1-hexene, 1-heptene, 1-octene, or 1-decene.

In various embodiments, the step (iii) is carried out at a temperature of from about 30° C. to about 150° C.

Effects of Invention

According to the method of the present invention, an organopolysiloxane having a silicon atom-bonded alkoxysilylalkyl group can be obtained without hydrolyzing any alkoxysilylalkyl groups.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

<Method for Producing an Organopolysiloxane>

The method for producing an organopolysiloxane according to the present invention is described below.

An organopolysiloxane in the step (i) is a raw material and has at least one silicon atom-bonded hydrogen atom per molecule, preferably at least two silicon atom-bonded hydrogen atoms per molecule. The molecular structure of the organopolysiloxane is not limited and can be straight chain, cyclic, and partially-branched straight chain, as desired. There are no limitations on the bonding position of the silicon atom-bonded hydrogen atoms in the organopolysiloxane, and the silicon atom-bonded hydrogen atoms may be bonded in, for example, terminal position on the molecular chain and/or side chain position on the molecular chain. Silicon-bonded groups other than hydrogen atoms in the organopolysiloxane may be monovalent hydrocarbon groups with 1 to 12 carbon atoms which are free of aliphatic unsaturated bonds. Examples of the monovalent hydrocarbon groups include methyl groups, ethyl groups, propyl groups, or similar alkyl groups; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups, but methyl groups are preferred.

In various embodiments, the organopolysiloxane is a straight chain diorganopolysiloxane represented by the following general formula:

$$R^1_2HSiO(R^1_2SiO)_nSiR^1_2H.$$

In the formula, $R^1$ are the same or different hydrocarbon groups and free of aliphatic unsaturated bonds. Examples of the hydrocarbon groups for $R^1$ include the same hydrocarbon groups described above.

In the formula, "n" is an integer of from about 1 to about 200, alternatively an integer of from about 5 to about 200, alternatively an integer of from about 10 to about 200, or alternatively an integer of from about 10 to about 150. The reasons for this are as follows: when "n" is not less than the lower limit of the aforementioned range, the final organopolysiloxane exhibits excellent reactivity to inorganic fillers; when, on the other hand, "n" is not more than the upper limit of the aforementioned range, the final organopolysiloxane may have a low viscosity.

Examples of the organopolysiloxanes include compounds such as those mentioned below.

$H(CH_3)_2SiO[(CH_3)_2SiO]_{10}Si(CH_3)_2H$ $H(CH_3)_2SiO[(CH_3)_2SiO]_{20}Si(CH_3)_2H$ $H(CH_3)_2SiO[(CH_3)_2SiO]_{40}Si(CH_3)_2H$ $H(CH_3)_2SiO[(CH_3)_2SiO]_{10}[(CH_3)HSiO]Si(CH_3)_2H$ $H(CH_3)_2SiO[(CH_3)_2SiO]_{20}[C_6H_5(CH_3)SiO]_{10}Si(CH_3)_2H$ $(CH_3)_3SiO[(CH_3)HSiO]_{20}Si(CH_3)_3$

Generally, such organopolysiloxanes are obtained by re-equilibration reaction of siloxane oligomers such as methylhydrogencyclosiloxane, dimethylcyclosiloxane, hexamethyldisiloxane, and tetramethyldisiloxane, in a presence of an acid catalyst used as a polymerization catalyst, and neutralization or removal of the acid catalyst. However, the organopolysiloxane may contain minute amount acidic catalyst residues if the neutralization is not enough.

In the step (i), the organopolysiloxane is treated with an alkali salt of carboxylic acid to neutralize the acidic catalyst residues in the organopolysiloxane.

The alkali salt is not limited, but it is preferably selected from sodium salt of acetic acid, or sodium salt of propionic acid.

The content of the alkali salt is not limited, but it is preferably in an amount of from about 100 to about 1,500 ppm, alternatively in an amount of from about 200 to about 1,000 ppm, or alternatively in an amount of from 500 to about 800 ppm, in a mass unit of the organopolysiloxane. The reasons for this are as follows: when the content is not less than the lower limit of the aforementioned range, it is easy to complete the neutralization of the acid catalyst residues; when, on the other hand, it is not more than the upper limit of the aforementioned range, it is economical, and it is easy to remove the alkali salt from the organopolysiloxane after treatment.

In the step (ii), the treatment is carried out by ordinary means way such as an agitation, and a rotation. Completion of neutralizing the acidic catalyst residues in the organopolysiloxane may not be detected by current test method such as pH measurement test, acid value test, and the like because of the quite low level of acid residual and the neutralization mechanism with sodium acetate. However, an ionic conduction test of extracted water, an ion-exchange chromatography test of extracted water, and the like may be available. In general, the agitation or rotation may be conducted at about 40 from about 70° C. for about 1 to about 5 hrs., preferably at about 50 from about 70° C. for about 2 to about 4 hrs., between the organopolysiloxane and enough sodium acetate to make sure the neutralization is sufficient.

Then, the alkali salt is removed from the organopolysiloxane by filtration due to the potential risk of making the pH value of reaction environment too high (>9) which will also cause side reaction, and further more affect the final quality of product.

In the step (iii), the organopolysiloxane is reacted with an alkenyl group-containing alkoxysilane and an optional olefin with 4 to 20 carbon atoms in the presence of a platinum base catalyst.

The alkoxysilane is a raw material to introduce a silicon atom-bonded alkoxysilylalkyl group into the final product, and has an alkenyl group. The alkenyl groups may be alkenyl groups with 2 to 12 carbon atoms. Examples of the alkenyl groups include vinyl groups, allyl groups, butenyl groups, propenyl groups, pentenyl groups, hexenyl groups, heptenyl groups, octenyl groups, and decenyl groups, but hexenyl groups, octenyl groups, and decenyl groups are preferred.

Alkoxy groups in the alkoxysilane may be alkoxy groups with 1 to 3 carbon atoms. Examples of the alkoxy groups include methoxy groups, ethoxy groups, and propoxy groups.

Silicon-bonded groups other than the alkenyl groups and alkoxy groups in the alkoxysilane may be monovalent hydrocarbon groups with 1 to 12 carbon atoms which are free of aliphatic unsaturated bonds. Examples of the monovalent hydrocarbon groups include methyl groups, ethyl groups, propyl groups, or similar alkyl groups; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups, but methyl groups are preferred.

In various embodiments, the alkoxysilane is represented by the following general formula:

$$R^2SiR^3{}_a(OR^4)_{(3-a)}.$$

In the formula, $R^2$ is an alkenyl group with 2 to 12 carbon atoms. Examples of the alkenyl groups include vinyl groups, allyl groups, butenyl groups, pentenyl groups, hexenyl groups, heptenyl group, octenyl groups, and decenyl groups, among which allyl group and hexenyl group are preferred from the perspective of economic efficiency and reactivity.

In the formula, $R^3$ is a hydrocarbon group with 1 to 12 carbon atoms and is free of aliphatic unsaturated bond. Examples of the hydrocarbon groups for $R^3$ include the same hydrocarbon groups for $R^1$ described above.

In the formula, $R^4$ is an alkyl group with 1 to 3 carbon atoms. Examples of the alkyl groups include methyl groups, ethyl groups and propyl groups, among which methyl groups are preferably.

In the formula, "a" is 0, 1 or 2, alternatively 0.

Examples of the alkoxysilanes include compounds such as those mentioned below.

$CH_2$=$CHSi(OCH_3)_3$
$CH_2$=$CHSiCH_3(OCH_3)_2$
$CH_2$=$CHSi(OC_2H_5)_3$
$CH_2$=$CHCH_2Si(OCH_3)_3$
$CH_2$=$CHCH_2Si(OC_2H_5)_3$
$CH_2$=$CHCH_2Si(OCH_3)_2(OC_2H_5)$

The content of the alkoxysilane is not limited, but it is preferably in an amount such that a mole ration of the alkoxysilane to the silicon atom-bonded hydrogen atoms in the organopolysiloxane is in a range of from about 0.1 to about 1, alternatively in a range of from about 0.1 to about 0.5, or alternatively in a range of from about 0.1 to about 0.3. The reasons for this are as follows: when the content is not less than the lower limit of the aforementioned range, the final organopolysiloxane exhibits excellent reactivity to inorganic fillers; when, on the other hand, it is not more than the upper limit of the aforementioned range, it is easy to reduce by-products which will also cause negative influence on the final application.

The platinum base catalyst is a catalyst for accelerating hydrosilylation reaction of the organopolysiloxane and the alkoxysilane. In various embodiments, the platinum base catalyst is selected from platinum fine powder, platinum black, platinum supporting silica fine powder, platinum supporting activated carbon, chloroplatinic acid, alcohol-modified chloroplatinic acid, or complexes of chloroplatinic acid with olefins, aldehydes, vinylsiloxanes or acetylene alcohols.

The platinum base catalyst is added in a quantity sufficient to enhance the hydrosilylation reaction. However, it is preferably in a range of from about 1 to about 1,000 ppm, alternatively in a range of from about 1 to about 500 ppm, or alternatively in a range of from about 5 to about 100 ppm, in mass units as platinum metal in the reaction mixture. In various embodiments, the amount is not less than the lower limit of the aforementioned range from the viewpoint of accelerating reaction, and not greater than the upper limit of the aforementioned range from the viewpoint of reducing the remain of the platinum base catalyst in the final organopolysiloxane.

In the step (iii), the organopolysiloxane may be reacted with the alkoxysilane and an olefin with 4 to 20 carbon atoms simultaneously.

The olefin has 4 to 20 carbon atoms, alternatively 6 to 20 carbon atoms, or alternatively 6 to 12 carbon atoms. Examples of the olefins include 1-hexene, 1-heptene, 1-octene, and 1-decene.

The content of the olefin is not limited, but it is preferably in an amount such that a mole ration of the olefin to the silicon atom-bonded hydrogen atoms in the organopolysiloxane is in a range of from about 0.5 to about 1, alternatively in a range of from about 0.6 to about 1, or alternatively in a range of from about 0.8 to about 1. The reasons for this are as follows: when the content is not less than the lower limit of the aforementioned range, it is easy to reduce by-products; when, on the other hand, it is not more than the upper limit of the aforementioned range, the final organopolysiloxane exhibits excellent reactivity to inorganic fillers.

Conditions of the step (iii) is not particularly limited, but it is preferably that the step (iii) is carried out at a temperature of from about 30° C. to about 150° C., alternatively at a temperature of from about 50° C. to about 150° C., or alternatively a temperature of from about 50° C. to about 100° C.

Furthermore, after the step (iii), to reduce the content of a platinum base catalyst in the final organopolysiloxane, active carbon may be added to the reaction mixture, then removed from the final organopolysiloxane by means of filtration.

The organopolysiloxane obtained by the method of the present invention may be an organopolysiloxane having a silicon atom-bonded alkoxysilylalkyl group or a mixture of the organopolysiloxane having a silicon atom-bonded alkoxysilylalkyl group and an organopolysiloxane having silicon atom-bonded alkyl group with 6 to 20 carbon atoms.

Examples of the organopolysiloxanes include compounds such as those mentioned below. Moreover, X and Y in the formulas below denote an alkoxysilylalkyl group and an alkyl group with 6 to 20 carbon atoms, respectively.

$X(CH_3)_2SiO[(CH_3)_2SiO]_{10}Si(CH_3)_2X$
$X(CH_3)_2SiO[(CH_3)_2SiO]_{20}Si(CH_3)_2X$
$X(CH_3)_2SiO[(CH_3)_2SiO]_{40}Si(CH_3)_2X$
$X(CH_3)_2SiO[(CH_3)_2SiO]_{10}[(CH_3)(X)SiO]Si(CH_3)_2X$
$Y(CH_3)_2SiO[(CH_3)_2SiO]_{10}Si(CH_3)_2X$
$Y(CH_3)_2SiO[(CH_3)_2SiO]_{20}Si(CH_3)_2X$
$Y(CH_3)_2SiO[(CH_3)_2SiO]_{40}Si(CH_3)_2X$
$Y(CH_3)_2SiO[(CH_3)_2SiO]_{10}[(CH_3)(X)SiO]Si(CH_3)_2X$
$X(CH_3)_2SiO[(CH_3)_2SiO]_{10}[(CH_3)(Y)SiO]Si(CH_3)_2X$
$Y(CH_3)_2SiO[(CH_3)_2SiO]_{10}[(CH_3)(X)SiO]Si(CH_3)_2Y$
$Y(CH_3)_2SiO[(CH_3)_2SiO]_{10}[C_6H_5(CH_3)SiO]Si(CH_3)_2X$
$X(CH_3)_2SiO[(CH_3)_2SiO]_{10}[C_6H_5(CH_3)SiO]Si(CH_3)_2X$
$(CH_3)_3SiO[(CH_3)(X)SiO]_{20}Si(CH_3)_3$
$(CH_3)_3SiO[(CH_3)(X)SiO]_{10}[(CH_3)(Y)SiO]_{10}Si(CH_3)_3$

EXAMPLES

The method for producing an organopolysiloxane of the present invention will now be described in detail using Examples. In the Examples, the viscosity is the value at 25° C.

<Viscosity of Thermal Conductive Silicone Composition>

Viscosity of the thermal conductive silicone composition was measured by using a Cone/Plate viscometer (Brookfield HADV-II viscometer; Brookfieled Engineering Laboratories, Inc.) with 1 RPM at 25° C. neu

Practical Example 1

0.26 g of a sodium acetate and 457 g of an organopolysiloxane represented by the following formula:

$$H(CH_3)_2SiO[(CH_3)_2SiO]_{25}Si(CH_3)_2H$$

were loaded into a vessel, and agitated at 50° C. for 2 hrs.

After stirring the organopolysiloxane and sodium acetate at 50° C. for 2 hrs., the organopolysiloxane was cooled down and filtered to remove sodium acetate. The result pretreated organopolysiloxane will be used in next hydrosilylation step.

457 g of the organopolysiloxane treated by the sodium acetate, 15.7 g of a heptenyl trimethoxysilane and 48.7 g 1-octene were loaded into a 4-neck flask. N$_2$ in 500 ml/min. was purged into the mixture for 10 mins. 0.31 g of a platinum supporting active carbon (platinum content is 5 mass %) was added to the mixture. The mixture was heated to 60° C. under and agitated, then stopped heating. The temperature of the mixture was increased to 100° C. The mixture was cooled to 80° C. and was held for 2 hrs. Then, another 14 g of 1-octene was added to the mixture and the mixture was held for 1 hr. The mixture was heated to 150° C. under vacuum for 3 hrs. With N$_2$ sparging. The mixture was cooled to 80° C. and then vacuum was broken. 5.3 g of an active carbon was added to the mixture. After agitating for 1 hr., the active carbon was removed by using a filtration. As a result of $^1$H-NMR analysis, it was found that the final product was a mixture of 26 mass % of a dimethylpolysiloxane represented by the following formula:

$$C_8H_{17}(CH_3)_2SiO[(CH_3)_2SiO]_{25}Si(CH_3)_2C_6H_{12}Si(OCH_3)_3$$

2 mass % of a dimethylpolysiloxane represented by the following formula:

$$(CH_3O)_3SiC_6H_{12}(CH_3)_2SiO[(CH_3)_2SiO]_{25}Si(CH_3)_2C_6H_{12}Si(OCH_3)_3$$

and 72 mass % of a dimethylpolysiloxane represented by the following formula:

$$C_8H_{17}(CH_3)_2SiO[(CH_3)_2SiO]_{25}Si(CH_3)_2C_8H_{17}$$

Comparative Example 1

457 g of a sodium acetate untreated-organopolysiloxane represented by the following formula:

$$H(CH_3)_2SiO[(CH_3)_2SiO]_{25}Si(CH_3)_2H$$

15.7 g of a heptenyl trimethoxysilane and 48.7 g 1-octene were loaded into a 4-neck flask. N$_2$ in 500 ml/min. was purged into the mixture for 10 mins. 0.31 g of a platinum supporting active carbon (platinum content is 5 mass %) was added to the mixture. The mixture was heated to 60° C. under and agitated, then stopped heating. The temperature of the mixture was increased to 100° C. The mixture was cooled to 80° C. and was held for 2 hrs. Then, another 14 g of 1-octene was added to the mixture and the mixture was held for 1 hr. The mixture was heated to 150° C. under vacuum for 3 hrs. With N$_2$ sparging. The mixture was cooled to 80° C. and then vacuum was broken. 3 g of an active carbon was added to the reaction mixture. After agitating for 1 hr., the active carbon was removed by using a filtration. As a result of H-NMR analysis, it was found that the final product was a mixture of 0-16 mass % of a dimethylpolysiloxane represented by the following formula:

$$C_8H_{17}(CH_3)_2SiO[(CH_3)_2SiO]_{25}Si(CH_3)_2C_6H_{12}Si(OCH_3)_3$$

2 mass % of a dimethylpolysiloxane represented by the following formula:

$$(CH_3O)_3SiC_6H_{12}(CH_3)_2SiO[(CH_3)_2SiO]_{25}Si(CH_3)_2C_6H_{12}Si(OCH_3)_3$$

and 72 mass % of a dimethylpolysiloxane represented by the following formula:

$$C_8H_{17}(CH_3)_2SiO[(CH_3)_2SiO]_{25}Si(CH_3)_2C_8H_{17}$$

and 10-26 mass % of the hydrolyzed dimethylpolysiloxane represented by the following formula:

$$C_8H_{17}(CH_3)_2SiO[(CH_3)_2SiO]_{25}Si(CH_3)_2C_6H_{12}Si(OCH_3)_3$$

and the resulting hydrolyzed products represented by the following formula:

$$C_8H_{17}(CH_3)_2SiO[(CH_3)_2SiO]_{25}Si(CH_3)_2C_6H_{12}Si(OH)_a(OCH_3)_{3-a}$$

wherein a=1, 2 or 3.

Application Example 1

7.01 g of the organopolysiloxane obtained by Practical Example 1, 0.025 g of acetylene black (AB-100; Soltex Inc.), 23.24 g of zinc oxide powder with a number average particle size of 0.12 μm (Zoco 102; Zochem Inc.) were mixed at 1000 rpm/20 secs., and then at 1500 rpm/20 secs. Then, 34.87 g of zinc oxide powder with a number average particle size of 1.0 μm (DW-4; Fullore International Ltd. (HK)) was added to the mixture at 1000 rpm/20 secs., and then 1500 rpm/20 secs. 34.87 g of zinc oxide powder with a number average particle size of 1.0 μm (DW-4; Fullore International Ltd. (HK)) was added to the mixture at 1000 rpm/20 secs., and then 1500 rpm/20 secs. The mixture was stayed at room temperature for 24 hrs., and then the viscosity by using cone plate was measured. The viscosity is shown in Table 1.

Application Example 2

7.01 g of the organopolysiloxane obtained by Comparative Example 1, 0.025 g of acetylene black (AB-100; Soltex Inc.), 23.24 g of zinc oxide powder with a number average particle size of 0.12 μm (Zoco 102; Zochem Inc.) were mixed at 1000 rpm/20 secs., and then at 1500 rpm/20 secs. Then, 34.87 g of zinc oxide powder with a number average particle size of 1.0 μm (DW-4; Fullore International Ltd. (HK)) was added to the mixture at 1000 rpm/20 secs, and then 1500 rpm/20 secs. 34.87 g of zinc oxide powder with a number average particle size of 1.0 μm (DW-4; Fullore International Ltd. (HK)) was added to the mixture at 1000 rpm/20 secs., and then 1500 rpm/20 secs. The mixture was stayed at room temperature for 24 hrs., and then the viscosity by using cone plate was measured. The viscosity is shown in Table 1.

Application Example 3

7.01 g of an organopolysiloxane represented by the following formula:

$$(CH_3)_3SiO[(CH_3)_2SiO]_{110}Si(OCH_3)_3,$$

0.025 g of acetylene black (AB-100; Soltex Inc.), 23.24 g of zinc oxide powder with a number average particle size of 0.12 μm (Zoco 102; Zochem Inc.) were mixed at 1000 rpm/20 secs., and then at 1500 rpm/20 secs. Then, 34.87 g of zinc oxide powder with a number average particle size of 1.0 μm (DW-4; Fullore International Ltd. (HK)) was added to the mixture at 1000 rpm/20 secs, and then 1500 rpm/20 secs. 34.87 g of zinc oxide powder with a number average particle size of 1.0 μm (DW-4; Fullore International Ltd. (HK)) was added to the mixture at 1000 rpm/20 secs., and then 1500 rpm/20 secs. The mixture was stayed at room temperature for 24 hrs., and then the viscosity by using cone plate was measured. The viscosity is shown in Table 1.

TABLE 1

| | | Application Example 1 | Application Example 2 | Application Example 3 |
|---|---|---|---|---|
| Viscosity (cP) | at 1 rpm | 33,328 | NA (filler dispersion failed) | 195,300 |
| | at 5 rpm | 18,128 | NA (filler dispersion failed) | 111,400 |

INDUSTRIAL APPLICABILITY

According to the present invention, the organopolysiloxane having a silicon atom-bonded alkoxysilylalkyl group produced by the method can be obtained without hydrolyzing any alkoxysilylalkyl groups. Thus, the method is suitable for producing the organopolysiloxane which is useful as a surface modifier for various types of fillers.

The invention claimed is:

1. A method for producing an organopolysiloxane having at least one silicon atom-bonded alkoxysilylalkyl group per molecule, the method comprising the following steps:
   (i) treating an organopolysiloxane having at least one silicon atom-bonded hydrogen atom per molecule with an alkali salt of carboxylic acid, where the alkali salt of carboxylic acid is present in an amount of from 100 to 1,500 ppm;
   (ii) removing the alkali salt from the organopolysiloxane; and
   (iii) reacting the organopolysiloxane obtained by step (ii) with an alkenyl group-containing alkoxysilane in the presence of a platinum-based catalyst;
   wherein step (i) precedes step (iii).

2. The method according to claim 1, wherein the organopolysiloxane in step (i) is represented by the following general formula:

$$R^1_2HSiO(R^1_2SiO)_nSiR^1_2H$$

wherein each $R^1$ is the same or different hydrocarbon group with 1 to 12 carbon atoms and is free of an aliphatic unsaturated bond, and "n" is an integer of from 0 to 100.

3. The method according to claim 1, wherein the alkali salt in step (i) is selected from the group consisting of sodium salt of acetic acid and sodium salt of propionic acid.

4. The method according to claim 1, wherein the alkoxysilane in step (iii) is represented by the following general formula:

$$R^2SiR^3_a(OR^4)_{(3-a)}$$

wherein $R^2$ is an alkenyl group with 2 to 12 carbon atoms, $R^3$ is a hydrocarbon group with 1 to 12 carbon atoms and is free of an aliphatic unsaturated bond, $R^4$ is an alkyl group with 1 to 3 carbon atoms, and "a" is 0, 1 or 2.

5. The method according to claim 1, wherein the platinum-based catalyst in step (iii) is selected from the group consisting of platinum fine powder, platinum black, platinum supporting silica fine powder, platinum supporting activated carbon, chloroplatinic acid, alcohol-modified chloroplatinic acid, and complexes of chloroplatinic acid with olefins, aldehydes, vinylsiloxanes or acetylene alcohols.

6. The method according to claim 1, wherein the platinum-based catalyst in step (iii) is added in an amount such that platinum metal in the catalyst is in a range of from about 1 to about 1,000 ppm in mass unit relative to the total mass of the organopolysiloxane and the alkoxysilane.

7. The method according to claim 1, wherein the organopolysiloxane in step (iii) is reacted with the alkenyl group-containing alkoxysilane and an olefin with 4 to 20 carbon atoms simultaneously.

8. The method according to claim 7, wherein the olefin is selected from the group consisting of 1-hexene, 1-heptene, 1-octene, and 1-decene.

9. The method according to claim 1, further comprising the following step:

(iv) reacting the organopolysiloxane obtained by step (iii) with an olefin with 6 to 20 carbon atoms in the presence of a platinum-based catalyst.

10. The method according to claim 9, wherein the olefin is selected from the group consisting of 1-hexene, 1-heptene, 1-octene, and 1-decene.

11. The method according to claim 9, wherein step (iv) is carried out at a temperature of from about 30° C. to about 150° C.

12. The method according to claim 1, wherein step (iii) is carried out at a temperature of from about 30° C. to about 150° C.

13. The method according to claim 1, wherein the alkali salt of carboxylic acid is present in an amount of from 500 to 800 ppm.

\* \* \* \* \*